United States Patent [19]

Choulet

[11] 4,257,643
[45] Mar. 24, 1981

[54] UPPER STREAMLINING APPARATUS FOR THE CAB OF A HEAVY TRANSPORT VEHICLE

[75] Inventor: Robert Choulet, La Celle-Saint-Cloud, France

[73] Assignee: Societe d'Etudes et de Realisations Automobiles, Paris, France

[21] Appl. No.: 25,035

[22] Filed: Mar. 29, 1979

[30] Foreign Application Priority Data

Apr. 4, 1978 [FR] France .................. 78 10467

[51] Int. Cl.³ .............................. B62D 35/00
[52] U.S. Cl. ................... 296/1 S; 296/1 R
[58] Field of Search ........... 296/1 R, 1 S; 105/2 A

[56] References Cited

U.S. PATENT DOCUMENTS

| | | | |
|---|---|---|---|
| D. 249,783 | 10/1978 | Herpel ........................ | 296/1 S |
| 3,328,074 | 6/1967 | Van Rossem ................. | 296/1 S |
| 3,348,873 | 10/1967 | Saunders ..................... | 296/1 S |
| 3,711,146 | 1/1973 | Madzsar et al. .............. | 296/1 S |
| 3,819,222 | 6/1974 | Woodard ...................... | 296/1 S |
| 3,836,191 | 9/1974 | Götz ............................ | 296/1 S |
| 3,878,914 | 4/1975 | Gülick et al. ................ | 296/1 S |
| 4,006,931 | 2/1977 | Groves ......................... | 296/1 S |
| 4,036,519 | 7/1977 | Servais et al. ............... | 296/1 S |
| 4,057,280 | 11/1977 | MacCready, Jr. et al. .... | 296/1 S |

FOREIGN PATENT DOCUMENTS

| | | | |
|---|---|---|---|
| 2705702 | 9/1977 | Fed. Rep. of Germany ...... | 296/1 S |
| 1281254 | 7/1972 | United Kingdom ............. | 296/1 S |

*Primary Examiner*—John J. Love
*Assistant Examiner*—Ross Weaver
*Attorney, Agent, or Firm*—Sandler & Greenblum

[57] ABSTRACT

A streamlining apparatus for the cab of a heavy transport vehicle has a transverse section smaller than that of the body of the load transported and comprises an airflow deflector formed by a front part and two lateral rear parts. The apparatus further comprises an element adapted to engage the roof of the cab and which is connected to the front part of the deflector, this element comprising lateral parts, which, longitudinally, substantially conform to an upper surface of the cab, and a front part which extends to at least the level of the front transverse roof edge of the cab, with respect to both the downward and forward extents of the cab.

14 Claims, 7 Drawing Figures

UPPER STREAMLINING APPARATUS FOR THE CAB OF A HEAVY TRANSPORT VEHICLE

The present invention relates to an upper streamlining apparatus for the cab of a heavy transport vehicle, such as articulated trucks and tractor-trailer vehicles.

In numerous heavy transport vehicles, the body of the load transported, or the trailer body, has a transverse section which is substantially wider than that of the driver's cab. Moreover, these cabs and trailer bodies are often relatively angular, as is the case in present road transport vehicles.

The sharp angles formed by the transverse and longitudinal surfaces of the vehicles produce on the transverse surfaces a pressure which is substantially greater than that which would be exerted if these different surfaces were connected by progressive joins. This results in a considerable resistance against advancement, or drag.

Furthermore, in the presence of a relative wind, generally inclined with respect to the axis of the vehicles, a considerable vertical wash appears on the side opposite the wind, which causes a reduction in the pressure on the side in the set of the wind and on the rear transverse face of the vehicles. The difference in pressure on the two lateral longitudinal surfaces induces upper and lower transverse streams which strike the non-streamlined portions of the vehicles, e.g. the wheels, axles, suspension springs and beams. Due to this phenomenon and the reduction in pressure on the rear transverse surface, the aerodynamic drag of the vehicles is considerably increased.

Air-flow deflectors have already been proposed for the cab of a heavy transport vehicle, having a transverse section smaller than that of the body of the load transported, and are adapted to be fixed on the cab to deflect the airflow and prevent said airflow from striking the front transverse surface of the body. These deflectors comprise a front part, arranged to engage the roof of the cab, and two lateral rear parts.

However, the aerodynamic profile of these deflectors does not enable all of the discontinuities of the air flow at the level of the upper part of the cab to be eliminated, nor does it allow this flow to be directed tangentially with respect to the longitudinal surfaces of the body for a usual angles of the relative wind.

It is therefore an object of the present invention to improve the orientation of the airflow about the vehicles.

There is provided in accordance with the invention an apparatus for streamlining the cab of heavy transport vehicles having a transverse section smaller than that of the body of the load transported, The apparatus comprises comprising an airflow deflector formed by a front part and two lateral rear parts, wherein said apparatus further comprises an element adapted to engage the roof of the cab and connected to the front part of the deflector, this element comprising lateral parts, which, extend longitudinally an substantially can form to an upper surface of the cab, and a frontal part, which extends at least up to the level of the front transverse edge of the roof of the cab, both downwardly and forwardly of the cab.

Due to the element connected to the deflector of the streamlining apparatus of the invention, the vortices usually produced by the upper edges of the cab, and particularly the lateral edges, are wholly or partly eliminated, thus enabling the deflector to perform its function of air-flow guidance with optimum efficiency. In comparison with conventional devices, the streamlining apparatus of the invention achieves a much greater reduction in drag, particularly in the case of a strong cross wind.

In a preferred embodiment of the streamlining apparatus of the invention, the frontal part of said element tangentially extends over the front transverse surface of the cab.

In addition, each of the lateral longitudinal parts of said element may have a substantially semi-elliptical frontal profile.

The junction of said element to the deflector of the streamlining apparatus of the invention may advantageously be progressive and is preferably of the "Karman" type.

The invention will be more readily understood on reading the following description with reference to the accompanying drawings, in which.

Figure 1:
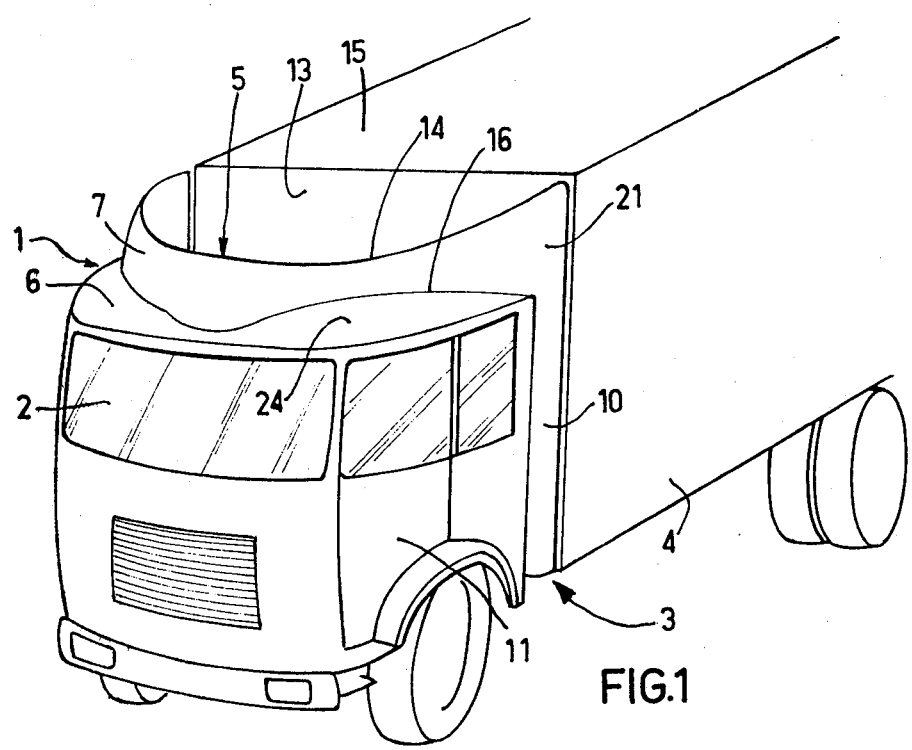
FIG. 1 is a perspective view of a first embodiment of the streamlining apparatus according to the invention, mounted on an articulated truck.
Figure 2:
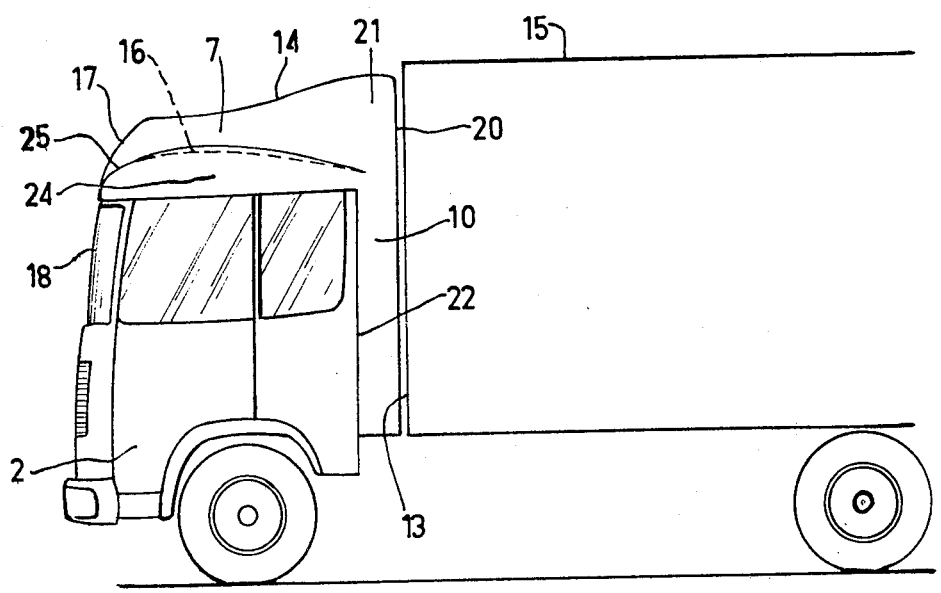
FIG. 2 is a side view of the streamlining apparatus of FIG. 1.

Referring now to the drawings, FIGS. 1 to 4 show a streamlining apparatus 1 according to the invention, which is very closely fitted on a cab 2 of an articulated truck 3, of which the body of the load transported or the trailer body 4 has a transverse section greater than that of the cab 2.

The streamlining apparatus 1 comprises a deflector 5 and an element 6 connected together.

The deflector 5 comprises a front part 7 which engages the roof 8 of the cab 2 by its inner lower edge 9 (FIG. 3), and two lateral rear parts 10 which extend vertically along the lateral surfaces 11 of the cab 2 and which have a height substantially equal to that of the trailer body 4. It will be noted that the front part 7 does not necessarily engage the roof 8 and may be maintained only due to its connection with the element 6 described hereinafter. The front part 7 extends laterally at 21 as far as the rear parts 10, thereby having a top surface with a height also substantially equal to that of the trailer body 4. The height of the rear parts 10 is substantially equal to that of the body 4. The front part 7 is substantially elliptica in form, the horizontal sections of which are ellipses having as axes straight lines located respectively in the median plane 12 of the truck 3 and in the frontal surface 13 of the body 4. The upper edge 14 of the front part 7 of the deflector 5 rises progressively from its center to the sides and from the front to the rear at 21, substantially up to the height of the upper longitudinal surface 15 of the trailer body 4. The outer lower edge 16 of the front part 7 which, as will be seen hereinafter, corresponds to the connection region of the deflector 5 and the element 6, descends, in its forwardmost part 17, almost to the roof 8 of the cab 2, so that this part 17 tangentially extends along the front transverse roof edge 18 of the cab 2. The lateral rear parts 10 are connected to the rear transverse surface 19 of the cab 2 along a suitable surface, shown in FIG. 3.

A deflector might also have been considered of which the height of the front part 7 is substantially uniform, its upper edge 14 rising only at the rear, at 21.

For the streamlining apparatus according to the invention to be used on a tractor-trailer vehicle, the depth of the lateral parts 10, between their vertical rear trailing edges 20, albeit substantially parallel to the axis of the truck, and the rear 22 of the cab 2, is not so great in order to allow, during maneuvers, a considerable clearance for the trailer, or semi-trailer, with respect to the tractor.

The element 6 is mainly composed of two lateral longitudinal parts 24 having, in the longitudinal direction, substantially the shape of an upper surface of the cab, so that the front parts 25 of these two upper surfaces tangentially extend along the front surface or roof edge 18 of the cab 2. In the lateral direction, each part 24 of the element 6 has a substantially semi-elliptic form and slightly projects beyond the roof 8 of the cab 2, while remaining within the maximum overall width prescribed.

Figure 3:
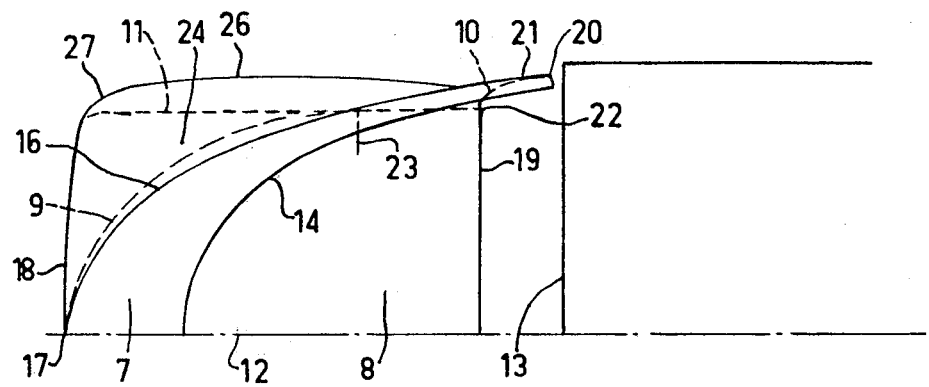
FIG. 3 is a partial plan view of the streamlining apparatus of FIG. 1.
Figure 4:
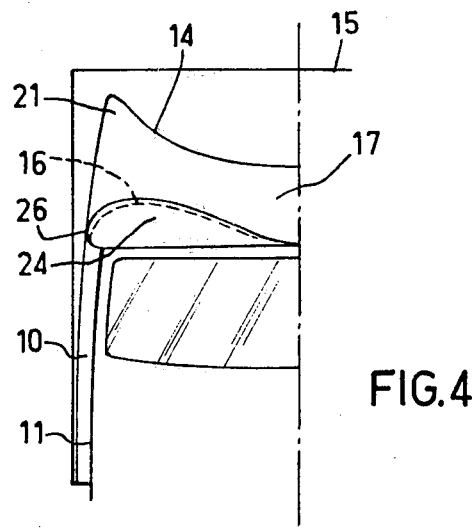
FIG. 4 is a partial front plane view of the streamlining apparatus of FIG. 1.

The two parts 24 of the element 6 join on the roof 8 of the cab 2 at the level of the forwardmost part 17 of the front part 7 of the deflector 5. As shown in FIG. 3, the upper longitudinal profile 26 of each part 24 extends along the front transverse surface 18 of the cab 2 in a regular and continuous curve 27.

The juncture 16 of the element 6 and the deflector 5 of the streamlining apparatus 1, corresponding to the lower edge of the deflector 5 and to the upper edge of the element 6, is effected in a progressive connection of the well known "Karman" type.

Apart from the fact that the streamlining apparatus 1 of the invention is in integrated form, which allows it to be simply and rapidly placed in position, and the fact that it comprises fixing means, such as for example fastenings 23, fixed to the periphery of the cab 2 in order to maintain it in place, harmoniously distribute the forces and thus protect the cab, the streamlining apparatus 1 has and additional very great advantage, as will be explained hereinafter.

The deflector 5 of the streamlining apparatus 1 of the invention, if it were used alone, would reduce the aerodynamic drag of the truck 3. However, this reduction in drag would only occur for angles of attack of the relative wind within a predetermined range. In fact, the curve representing the reduction in drag, obtained with the deflector 5 alone, as a function of the angle of attack of the relative wind, of which the ordinate at the origin is clearly not zero, shows a maximum for a first value of this angle, however low, before being annulled for a second value of this angle. The negative slope of this curve, beyond this said first angle value, is in fact due to the discontinuities of the air-flow caused by the upper edges of the cab and to the aerodynamic profile of this deflector, insufficient to direct this flow tangentially to the longitudinal surfaces of the trailer body. Beyond said second angle value, the drag would increase, this being, of course, prejudicial to the correct running of the truck.

The addition to the deflector 5 of the element 6 of the streamlining apparatus 1 of the invention enables the above drawback to be obviated. It is thus observed, with the streamlining apparatus of the invention, that not only the reduction in drag, for a zero incidence of the relative wind, is greater than that obtained by using deflector 5 alone, but also that the curve representing the reduction in drag is entirely straightened and displaced towards the positive values, with respect to the first curve mentioned previously, with the result that the greater the angle of attack of the relative wind, the greater the reduction in drag obtained. It is because the deflector 5, due to its cooperation with element 6, serve its role of airflow guide perfectly that the invention achieves such a result.

It will be noted that the longitudinal edges 26 of the lateral longitudinal parts 24 of the element 6 may advantageously be covered with longitudinal tapers which enable the upper surfaces to be better connected with the lateral longitudinal surfaces 11 of the cab 2, if the cab is particularly angular, so that the breakdown of the air-flow on these longitudinal edges 26 occurs further back when the angle of attack of the relative wind is not zero.

Figure 5:
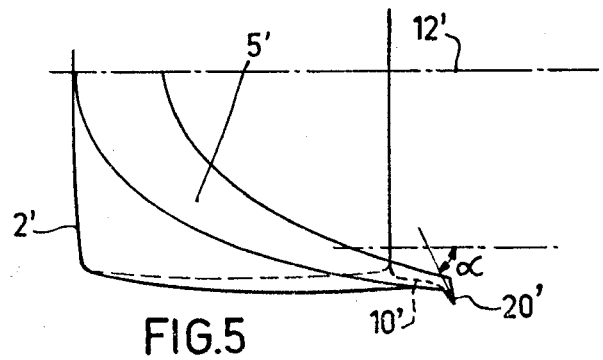
FIG. 5 is a partial plan view of a second embodiment of the streamlining apparatus of the invention.

In the form 1' of the streamlining apparatus of the invention, shown in FIG. 5, the vertical rear trailing edges 20' of the side parts 10' of the deflector 5' of the streamlining apparatus, identical to that of FIGS. 1 to 4, are no longer directed substantially parallel to the axis 12' of the vehicle, but are, because of their height opposite the cab 2', inclined with respect to this axis by an angle α preferably between 30° and 90°. Due to this arrangement, the lateral parts 10' may better serve as a deflector during an oblique cross wind.

Figure 6:
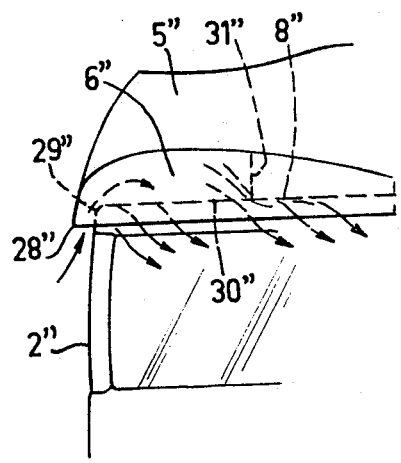
FIG. 6 is a side view of partial a third embodiment of the streamlining apparatus of the invention.

In the embodiment 1" of the streamlining apparatus of the invention shown in FIG. 6, the element 6" is disposed slightly above the roof 8" of the cab 2", the front edge 38" of the element 6" extending substantially beyond the front edge 29" of the roof 8", both downwardly and forwardly of the cab 2".

Thus, an air passage is created between this roof 8" and the interior of the element 6", the air penetrating through the gap between the front edge 28" of the element 6" and the upper front edge 29" of the cab 2", and leaving laterally through the gaps between the longitudinal edges 26" of the element 6" and the upper lateral edges 30" of the cab 2", in the direction of the arrows shown in the Figure. This results in a complementary circulation of air causing a blowing of the flow along the lateral surfaces of the vehicle, thereby advantageously reducing the breakdowns of this flow on these surfaces, when the cab has a profile, seen from above, which is particularly angular. It will be noted that this complementary circulation may be improved by disposing between the roof 8" and the upper surfaces of the element 6", sealing plates 31".

Figure 7:
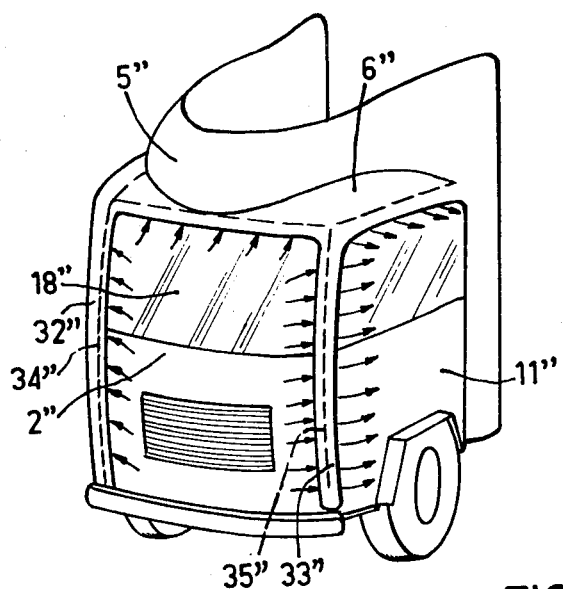
FIG. 7 is a perspective view of a second embodiment of the streamlining apparatus of FIG. 6.

In this latter case and in accordance with FIG. 7, two panels 32" and 33" may also be added to the deflector 5" and the element 6", which panels extend respectively along the two vertical front edges 34" and 35" of the cab 2", and at a short distance from these edges. The passages made between these panels and the cab, associated with those which are made between the element 6" and the roof of the cab, allow excellent guidance of the air, in the direction of the arrows in the Figure, from the front transverse surface 18" towards the lateral longitudinal surfaces 11" of the cab.

The various embodiments of the streamlining apparatus of the invention, shown in the drawings, are formed integrally by casting. Other shaping processes may, however, also be used, without departing from the scope of the invention. The drawings show an articulated truck, but the invention is not limited to this type of vehicle and is applicable as well to all types of tractor-trailer vehicles. Finally, these different embodiments of the streamlining of the invention are connected to the cab, but it is clear that others may be imagined which are integral with the cab.

What I claim is:

1. A streamlining apparatus for the cab of a heavy transport vehicle, said cab having a roof, an upper roof surface, a front transverse edge, side edges and a transverse section having a width smaller than that of the body of a load being transported by said cab, said apparatus comprising an air-flow deflector having a front part and two lateral rear parts, and an element adapted to engage the roof of the cab and connected to the front part of said deflector, said element comprising lateral parts which are adapted to extend laterally over the cab between said deflector front part and said edges and have substantially curved upper surfaces and a front part which is adapted to extend to at least said front transverse roof edge, both with respect to the forward and downward extent of the cab.

2. A streamlining apparatus as claimed in claim 1, wherein the lateral parts of said element have a substantially semi-elliptic front profile.

3. A streamlining apparatus as claimed in claim 1, wherein said element is connected to the front part of said deflector by a connection of the "Karman" type.

4. A streamlining apparatus as claimed in claim 1, wherein said cab includes lateral surfaces and wherein the two lateral rear parts of the deflector are adapted to extend vertically along the lateral surfaces of the cab and have a height substantially equal to the height of said load.

5. A streamlining apparatus as claimed in claim 4, wherein the front part of the deflector is adapted to extend laterally up to said rear parts and includes a top surface having a height substantially equal to the height of the upper surface of said load.

6. A streamlining apparatus as claimed in claim 1, wherein the front part of said deflector has a substantially elliptical form.

7. A streamlining apparatus as claimed in claim 1, wherein the upper edge of the front part of the deflector progressively increases from the center of said front part towards the lateral parts and from the front towards the rear of the deflector substantially to the level of the upper longitudinal surface of said load.

8. A streamlining apparatus as claimed in claim 1, wherein said lateral rear deflector parts include vertical rear trailing edges which are inclined with respect to the median plane of the cab.

9. A streamlining apparatus as claimed in claim 1 wherein said front part of said element is adapted to tangentially extend along the front transverse roof edge of the cab.

10. A streamlining apparatus as claimed in claim 9, wherein each of said lateral parts of said element has an upper longitudinal profile which is adapted to extend over the front surface of the cab along a regular and continuous curve.

11. A streamlining apparatus as claimed in claim 1, wherein said element is adapted to be disposed slightly above the roof of the cab and has a front edge which is adapted to extend beyond the front transverse roof edge of the cab, both with respect to the forward and downward extent of the cab.

12. A streamlining apparatus as claimed in claim 11, further comprising two panels adapted to extend downwardly along two vertical front edges of the cab, and being spaced by a short distance from said edges.

13. A streamlining apparatus as claimed in claim 11, wherein sealing plates are disposed between the roof of the cab and inner surfaces of the lateral parts of said element.

14. A streamlining apparatus as claimed in claim 1, said lateral parts of said element having longitudinal edges which are covered with longitudinal tapers.

* * * * *

UNITED STATES PATENT AND TRADEMARK OFFICE
CERTIFICATE OF CORRECTION

PATENT NO. : 4,257,643

DATED : March 24, 1981

INVENTOR(S) : Robert CHOULET

It is certified that error appears in the above—identified patent and that said Letters Patent is hereby corrected as shown below:

In the Foreign Application Priority Data, "Apr. 4" should be --Apr. 7--.

Column 1, line 18, "joins" should be --joints--;
line 47, "a" should be --the--;
line 47, "the" should be --a--;
line 54, "," should be --.--;
line 54, "com-" should be deleted;
line 55, "prises" should be deleted;
line 59, "," (third occurrence) should be deleted;
line 60, "an" second occurrence should be --and--;
line 60, "can form" should be --conform--.

Column 2, line 28, "plane" should be --plan--;
line 32, "partial" should be deleted;
line 32, after "a" (first occurrence), --partial-- should be inserted;
line 54, "also" should be deleted; and
line 57, "elliptica" should be --elliptical--.

Column 3, line 44, "and" should be --an--; and
line 67, "abserved" should be --observed--.

UNITED STATES PATENT AND TRADEMARK OFFICE
CERTIFICATE OF CORRECTION

PATENT NO. : 4,257,643

DATED : March 24, 1981

INVENTOR(S) : Robert CHOULET

It is certified that error appears in the above—identified patent and that said Letters Patent is hereby corrected as shown below:

Column 4, line 9, "serve" should be --serves--;

line 24, "that" should be --those--; and line 34, " 38" " should be --28"--.

Signed and Sealed this

Eleventh Day of August 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,257,643

DATED : March 24, 1981

INVENTOR(S) : Robert Choulet

It is certified that error appears in the above—identified patent and that said Letters Patent is hereby corrected as shown below:

On the title page, insert the second assignee as follows:

-- Ateliers Sainte-Catherine, Epone, France --.

Signed and Sealed this

Eighth Day of December 1981

[SEAL]

Attest:

GERALD J. MOSSINGHOFF

Attesting Officer

Commissioner of Patents and Trademarks